(12) United States Patent
Bjertrup et al.

(10) Patent No.: US 8,712,593 B2
(45) Date of Patent: Apr. 29, 2014

(54) METHOD FOR CONTROLLING OPERATION OF A WIND TURBINE

(75) Inventors: Thomas Steiniche Bjertrup, Randers SV (DK); Imad Abdallah, Randers C (DK); Kristian Balschmidt Godsk, Copenhagen N (DK)

(73) Assignee: Vestas Wind Systems A/S, Aarhus N. (DK)

( * ) Notice: Subject to any disclaimer, the term of this patent is extended or adjusted under 35 U.S.C. 154(b) by 298 days.

(21) Appl. No.: 13/129,798

(22) PCT Filed: Oct. 22, 2009

(86) PCT No.: PCT/EP2009/063911
§ 371 (c)(1),
(2), (4) Date: Sep. 2, 2011

(87) PCT Pub. No.: WO2010/057737
PCT Pub. Date: May 27, 2010

(65) Prior Publication Data
US 2011/0309621 A1 Dec. 22, 2011

Related U.S. Application Data

(60) Provisional application No. 61/199,648, filed on Nov. 18, 2008.

(30) Foreign Application Priority Data

Nov. 18, 2008 (DK) .......................... PA 2008 01606

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)
*F03D 9/00* (2006.01)
*H02P 9/04* (2006.01)

(52) U.S. Cl.
USPC ............... 700/286; 290/44; 290/55; 700/290

(58) Field of Classification Search
USPC .................. 700/286, 290; 290/44, 55; 416/27
See application file for complete search history.

(56) References Cited

U.S. PATENT DOCUMENTS 4,357,542 A * 11/1982 Kirschbaum ................... 290/44
4,426,192 A * 1/1984 Chertok et al. ................... 416/1
(Continued)

FOREIGN PATENT DOCUMENTS

EP 1736664 A1 12/2006
WO 2007123552 A1 11/2007

OTHER PUBLICATIONS

Danish Office Action for Danish application No. PA200801606 dated May 13, 2009.

(Continued)

*Primary Examiner* — Ronald Hartman, Jr.
(74) *Attorney, Agent, or Firm* — Patterson & Sheridan, LLP

(57) ABSTRACT

A method for controlling operation of a wind turbine and a method for controlling operation of a plurality of wind turbines positioned in a wind farm are disclosed. According to the method, a pitch and rotational speed curve, e.g. a θ versus λ curve, is selected from a group of pitch and rotational speed curve, and the wind turbine is operated in accordance with the selected curve for a short period, while monitoring at least one target parameter, e.g. power production or loads on one or more components. This is repeated for each of the curves of the group of pitch and rotational speed curves. This is also repeated a predetermined number of times, i.e. each curve is selected in turn a predetermined number of times. Based on the monitored target parameters an optimum curve is determined from the group of pitch and rotational speed curve, and the wind turbine is operated in accordance with this optimum curve. The method ensures that the applied curve is in fact optimal for the specific wind turbine, at the specific site and under the specific conditions. Thereby the wind turbine can be operated in a more optimal manner, e.g. with respect to power production and/or loads or wear on components.

20 Claims, 3 Drawing Sheets

(56) References Cited

U.S. PATENT DOCUMENTS

| | | | |
|---|---|---|---|
| 4,695,736 A * | 9/1987 | Doman et al. | 290/44 |
| 5,225,712 A * | 7/1993 | Erdman | 290/44 |
| 7,071,659 B1 * | 7/2006 | Torrey et al. | 318/254.1 |
| 7,420,289 B2 * | 9/2008 | Wang et al. | 290/44 |
| 7,528,496 B2 * | 5/2009 | Fortmann | 290/44 |
| 7,999,406 B2 * | 8/2011 | Cardinal et al. | 290/44 |
| 8,174,136 B2 * | 5/2012 | Johnson et al. | 290/44 |
| 8,249,753 B2 * | 8/2012 | Cleve et al. | 700/286 |
| 2007/0085343 A1 * | 4/2007 | Fortmann | 290/44 |
| 2007/0154310 A1 * | 7/2007 | Wobben | 416/1 |
| 2007/0183885 A1 | 8/2007 | Ormel et al. | |
| 2007/0216166 A1 * | 9/2007 | Schubert | 290/55 |
| 2008/0001409 A1 * | 1/2008 | Schellings | 290/44 |
| 2008/0001411 A1 * | 1/2008 | Ichinose et al. | 290/55 |
| 2008/0103611 A1 | 5/2008 | Altemark | |
| 2009/0212563 A1 * | 8/2009 | Morjaria | 290/44 |
| 2009/0218818 A1 * | 9/2009 | Cardinal et al. | 290/44 |
| 2009/0295159 A1 * | 12/2009 | Johnson et al. | 290/44 |
| 2010/0066087 A1 * | 3/2010 | Hayashi et al. | 290/44 |
| 2010/0301606 A1 * | 12/2010 | Hashimoto et al. | 290/44 |
| 2011/0089692 A1 * | 4/2011 | Girardin | 290/44 |
| 2011/0309621 A1 * | 12/2011 | Nielsen et al. | 290/44 |

OTHER PUBLICATIONS

International Search Report for International application No. PCT/EP2009/063911 dated Jan. 25, 2011.

* cited by examiner

METHOD FOR CONTROLLING OPERATION OF A WIND TURBINE

FIELD OF THE INVENTION

The present invention relates to a method for controlling operation of a wind turbine in such a manner that the wind turbine is operated in an optimal manner for that specific wind turbine at that specific site.

BACKGROUND OF THE INVENTION

Pitch controlled wind turbines are often operated at optimal tip speed ratio, i.e. in such a manner that, at each wind speed, an optimal tip speed ratio ($\lambda$) is obtained. To this end optimal tip speed ratio curves and optimal pitch curves are generated based on knowledge about expected optimal settings for obtaining an optimal power production. The curves may be generated purely on the basis of calculations. However, they may alternatively or additionally be based on measurements performed on identical or similar wind turbines. Some inaccuracies are introduced in the generation of the curves, because the numerical models used for calculating the values for the curves may be inaccurate, and because optimal settings may vary from one wind turbine to another, from one site to another and from one location to another within the same site.

EP 1 736 664 discloses a method and an apparatus for controlling a wind turbine. Values of relevant measurement parameters, e.g. wind speed and/or wind direction, are measured, e.g. at an external measurement station or at a neighbouring wind turbine. The measured values are processed and supplied to a control unit. The control unit then selects a set of control parameters and the wind turbine is controlled in accordance with these control parameters.

US 2007/0183885 A1 discloses a method for optimising the operation of a wind turbine. A control parameter is adjusted to a predetermined starting value. A response variable and a further variable indicative of an ambient condition are measured. This is repeated a number of times, the control parameter being varied at each repetition. A measured relation between the control parameter and the response variable and the variable indicative of an ambient condition is determined. Based on this, an optimised value of the control parameter with respect to the response variable is determined, and a set point of the control parameter is adjusted to the optimised value.

DESCRIPTION OF THE INVENTION

It is an object of embodiments of the invention to provide a method for controlling operation of a wind turbine, in which specific circumstances of the wind turbine are taken into account.

It is a further object of embodiments of the invention to provide a method for controlling operation of a wind turbine, in which specific site conditions are taken into consideration.

It is an even further object of embodiments of the invention to provide a method for controlling operation of a wind turbine, in which curves used for selecting control parameters have been generated in a more accurate manner than is the case for prior art control methods.

It is an even further object of embodiments of the invention to provide a method for controlling operation of a plurality of wind turbines of a wind farm, in which local variations across the site of the wind farm are taken into account.

According to a first aspect the invention provides a method for controlling operation of a wind turbine, the method comprising the steps of:

a) selecting a pitch and rotational speed curve from a group of pitch and rotational speed curves, b) operating the wind turbine in accordance with said selected curve, while monitoring at least one target parameter, c) repeating the steps of selecting a pitch and rotational speed curve and operating the wind turbine until each of the curves of the group of pitch and rotational speed curves has been selected, d) repeating steps a)-c) a predetermined number of times, e) based on the monitored target parameter(s), determining an optimum curve among the curves of the group of pitch and rotational speed curves, and f) controlling operation of the wind turbine in accordance with the optimum curve.

The present invention relates to a method for controlling operation of a wind turbine, in particular a wind turbine of a large modern type. The wind turbine may be controlled in order to achieve certain objectives, e.g. a desired output power, acceptable load levels on various components of the wind turbine, etc. A selected control strategy will often depend on which objectives are considered most important in the specific case, as well as on the particular levels, e.g. output power or load level, it is desired to reach.

According to the method of the invention a pitch and rotational speed curve is initially selected from a group of pitch and rotational speed curves. In the present context the term 'pitch and rotational speed curve' should be interpreted to mean a curve which reflects the pitch angle as well as the rotational speed of the wind turbine, e.g. a reflecting a relationship between the pitch angle and the rotational speed, under given circumstances. Selecting such a curve and operating the wind turbine in accordance with the selected curve determines the behaviour of the wind turbine under the given circumstances, e.g. in terms of power output and/or loads.

A group of pitch and rotational speed curves is, thus, a collection of predefined curves, each reflecting the pitch and the rotational speed of the wind turbine under given operational conditions as described above. Accordingly, the step of selecting a pitch and rotational speed curve from a group of pitch and rotational speed curves is performed by selecting one of the predefined curves forming part of the set of curves. The curves are preferably predefined in a manner which ensures that when the wind turbine is operated in accordance with one of the curves, it is operated within a specified load envelope. Thus, it is ensured that the turbine is not subjected to excessive loads.

The pitch and rotational speed curves may each be constructed on the basis of empirical data, calculations and/or using any other suitable criteria. The pitch and rotational speed curves could, e.g., be optima tip speed ratio curves and/or optimal pitch curves. In this case, the group of sets of parameter settings could, e.g., be a number of optimal tip speed ratio curves and/or optimal pitch curves.

Subsequently, the wind turbine is operated in accordance with the selected pitch and rotational speed curve. This should be interpreted to mean that the wind turbine is operated in such a manner that corresponding values of the pitch and the rotational speed are selected in such a manner that the selected curve is followed. The wind turbine is then operated with the applied settings. Simultaneously, at least one target parameter is monitored. In the present context the term 'target parameter' should be interpreted to mean a parameter which defines an objective which it is intended to achieve during operation of the wind turbine. Examples of target parameters include, but are not limited to, output power of the wind turbine, loads on various components of the wind turbine, e.g. tower, blades, drive train, bearings, etc. Since the target parameter(s) is/are monitored while the wind turbine is operated in accordance with the selected pitch and rotational speed curve, it can be established whether or not a given monitored target parameter 'behaves' as expected and/or desired in response to the selected curve.

The steps of selecting a pitch and rotational speed curve and operating the wind turbine are repeated until each of the curves of the group of pitch and rotational speed curves has been selected. Thus, each of the curves of the group of pitch and rotational speed curves is sequentially selected, and the wind turbine is operated in accordance with each of the curves while the target parameter(s) is/are monitored. This makes it possible to determine which of the curves is most optimal with respect to a given target parameter under the actual operating conditions for the actual wind turbine at the actual site. Thus, each of the curves is 'tested' to determine which of the curves is the most optimal.

The sequential selection of each of the pitch and rotational speed curves is repeated a predetermined number of times. Thereby each of the curves is 'tested' sequentially a predetermined number of times. Thereby short term variations in operating conditions, e.g. caused by gusts, will have less influence on the evaluation of the curves. Thereby the possibility of identifying the optimum curve under the prevailing wind conditions is increased.

Based on the monitored target parameter(s), an optimum curve among the curves of the group of pitch and rotational speed curves is selected, as described above. As mentioned above, the selected curve is 'optimum' in the sense that it is the curve which results in one or more target parameters being as close as possible to a desired level. The selected optimum curve is then applied to the wind turbine, i.e. the wind turbine is operated in accordance with the selected optimum pitch and rotational speed curve.

Thus, according to the method of the first aspect of the invention, the pitch and rotational speed curve used for controlling the wind turbine is selected on the basis of actual measurement performed on the actual wind turbine at the actual site and under the current operating conditions. Thereby it is ensured that the wind turbine is operated in a manner which is really optimum under the given circumstances, rather than in a manner which is theoretically optimum. This allows the wind turbine to be operated in a more optimal manner, e.g. in terms of power output and/or in terms of wear or fatigue on one or more components of the wind turbine.

As mentioned above, the pitch and rotational speed curves may be optimal tip speed ration curves and/or optimal pitch curves.

The monitored target parameter(s) may include, but is not limited to, power production of the wind turbine and/or load on one or more components of the wind turbine. Examples of such components include, but are not limited to, turbine blades, tower, gear box, generator, main shaft, hub, drive train and blade bearings.

The method may further comprise the step of repeating steps a)-f) after a predefined time interval has lapsed. According to this embodiment, a new optimum pitch and rotational speed curve is identified as described above after the predetermined time interval has lapsed. Operating conditions may change over time, e.g. due to seasonal variations. Thus, as seasons change, the wind conditions are expected to change, e.g. being more windy during autumn and winter than during summer, wake conditions changing, e.g. due to a shift in the wind direction, or due to varying amount of leaves on neighbouring trees or other vegetation, etc. It may therefore be desirable, or even necessary, to determine an optimum pitch and rotational speed curve at regular intervals, e.g. every three months. The process described above may, e.g., be performed during a week, and the selected optimum pitch and rotational speed curve may be applied to the wind turbine for the next three month, after which a new optimum pitch and rotational speed curve is determined during, e.g., a week.

There may also be differences in operating conditions between night and day. It may therefore be desirable to determine one optimum pitch and rotational speed curve for use during daytime and another optimum pitch and rotational speed curve for use during the night.

The predefined time interval may be substantially longer than the time required for performing steps a)-e). According to this embodiment, the wind turbine is operated in accordance with the selected optimum set of parameter setting for the majority of the time, and the process of determining an optimum set of parameter settings is performed in a short time compared to the total operating time of the wind turbine. As mentioned above, the predefined time interval may be approximately three months, while the time required for performing steps a)-e) may be approximately one week.

The step of determining an optimum curve among the curves of the group of pitch and rotational speed curves may further be performed on the basis of statistical data relating to operation of the wind turbine, said statistical data having been previously obtained and stored. Such statistical data may originate from previously performing steps a)-e). Alternatively or additionally, it may originate from measurements performed during normal operation of the wind turbine. The statistical data may, e.g., include measurements of power production of the wind turbine and/or load measurements on various components of the wind turbine, such as hub, blades, bearings, tower, gear, drive train, etc. Alternatively or additionally, the statistical data may comprise information relating to previously selected optimum pitch and rotational speed curves. The statistical data may indicate that the optimum curve which was found by performing steps a)-e) is in fact not the real optimum curve. This may, e.g., be because exceptional weather conditions have occurred while the steps were performed. Thus, taking the statistical data into account may lead to a slightly different curve being selected as the optimum curve and applied to the wind turbine.

Alternatively or additionally, the step of determining an optimum curve among the curves of the group of pitch and rotational speed curve may further be performed on the basis of information relating to one or more neighbouring wind turbines. This is particularly useful when the wind turbine is arranged in a wind farm. Information obtained by one or more neighbouring wind turbines may provide valuable additional information regarding the site of the wind turbines. Using this valuable additional information when selecting the optimum curve even further ensures that the selected curve is truly the optimum for that specific wind turbine. Furthermore, if the relative positions of the wind turbines and the wind direction are known, information obtained by a neighbouring wind turbine may provide information about wake conditions caused by neighbouring wind turbines.

According to one embodiment, the information relating to one or more neighbouring wind turbines may have been obtained by performing at least the steps a)-e) with respect to each of the neighbouring wind turbines. According to this embodiment, a number of wind turbines arranged in the vicinity of each other, e.g. in a wind farm, can be operated in a manner which takes operation of the other wind turbines into account. Thereby control strategies can be selected which ensure an optimal operation of the wind farm as a whole, even if some of the wind turbines are not individually operated in an optimal manner. For instance, it may be an advantage to operate a wind turbine which is arranged in the wind direction in such a manner that a power production is obtained which is less than optimal. Thereby a larger amount of the energy of the wind is allowed to pass on to the wind turbines arranged fully or partly in the wake of this wind turbine. Thereby the total power production of the wind farm may be optimised, possibly while reducing the load on the components of at least the 'front' turbine.

According to a second aspect the invention provides a method for controlling operation of a plurality of wind turbines positioned in a wind farm, the method comprising the step of, for each of the wind turbines, performing the method according to the first aspect of the invention.

As described above, the plurality of wind turbines are controlled on the basis of measurements performed on the actual wind turbines at the actual site and under the actual wind conditions.

The operation of each of the wind turbines may further be controlled on the basis of data obtained for one or more of the remaining wind turbines of the wind farm.

As described above, operation of the wind farm may advantageously be controlled in such a manner that the overall operation of the wind farm is optimised.

BRIEF DESCRIPTION OF THE DRAWINGS

The invention will now be described in further detail with reference to the accompanying drawings in which.

DETAILED DESCRIPTION OF THE DRAWINGS

Figure 1:
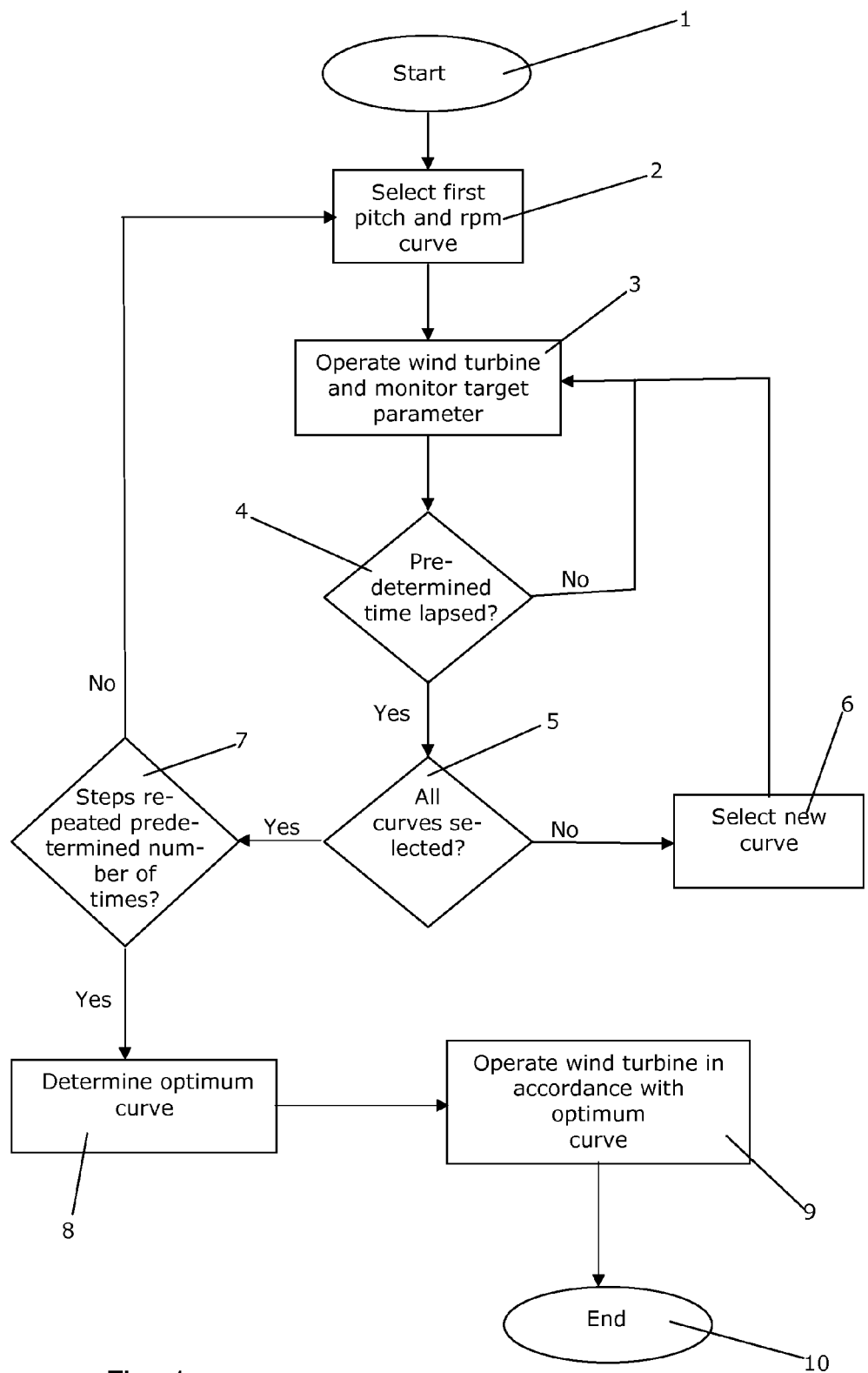
FIG. 1 is a flow diagram illustrating the method steps of a method according to an embodiment of the invention.

FIG. 1 is a flow diagram illustrating the method steps of a method according to an embodiment of the invention. The method is initiated at step 1. At step 2 a first pitch and rotational speed curve is selected from a group of pitch and rotational speed curves. At step 3 the selected curve is applied to a wind turbine, and the wind turbine is operated in accordance with the selected curve. As described above, the curve may, e.g., be an optimal tip speed ratio curve, and the group of pitch and rotational speed curves may be a collection of slightly different optimal tip speed ratio curves. During this, one or more target parameters is/are monitored. As described above, a target parameter may be a parameter which is indicative of an objective which it is desired to reach when operating the wind turbine. Suitable target parameters include power production and loads in one or more components of the wind turbine, e.g. the drive train, the blades, the tower construction, the hub, the bearings, etc.

At step 4 it is investigated whether or not a predetermined time has lapsed. If this is not the case, operation of the wind turbine in accordance with the selected pitch and rotational speed curve should be continued. The process is therefore returned to step 3. If, on the other hand, the predetermined time has lapsed, it is investigated at step 5 whether or not all the curves of the group of pitch and rotational speed curves has been selected. If this is not the case, a new curve is selected at step 6. The new curve is applied to the wind turbine, and the wind turbine is operated in accordance with the new curve for the predetermined time while monitoring the target parameter(s) as described above. Thus, each of the curves is sequentially selected and applied to the wind turbine.

When all of the curves have been selected as described above it is investigated, at step 7, whether or not the previous steps have been repeated a predetermined number of times. If this is not the case the procedure described above is repeated, i.e. the process is returned to step 2 where the first pitch and rotational speed curve is selected again.

Thus, the pitch and rotational speed curves are selected and applied to the wind turbine sequentially for a predetermined number of times. Thereby each of the curves is applied to the wind turbine for a predetermined number of predefined time intervals, the time intervals being spread substantially uniformly over the time it takes to perform the entire process. Thereby a substantial amount of data regarding the target parameter(s) is obtained for each of the curves, and the data obtained from the various curves are comparable due to the temporal spread of the measurement intervals.

When each of the pitch and rotational speed curves has been selected and applied to the wind turbine a predetermined number of times, an optimum curve is selected at step 8. The optimum curve is determined on the basis of the obtained data regarding the target parameter(s). For instance, the pitch and rotational speed curve which provides the most optimal value for one or more of the target parameter(s) under the given operating conditions may be determined to be the optimum curve. The procedure described above ensures that sufficient data is available to ensure that the optimum curve which is determined in step 8 is in fact the optimum curve under the prevailing operating conditions, because the data obtained for each curve is obtained during a long time interval, and data for all of the curves is obtained during the same long time interval.

Once the optimum curve has been determined at step 8, the optimum curve is applied to the wind turbine, and the wind turbine is operated in accordance with the selected optimum curve. Thus, the optimum curve is used for controlling operation of the wind turbine for a longer time period.

The method illustrated in the flow diagram of FIG. 1 and described above can be performed again after a longer time period has lapsed. Thereby a new optimum curve can be determined, e.g. in the case that the operating conditions have changed in such a manner that the previous optimum curve is no longer optimum.

Figure 2:
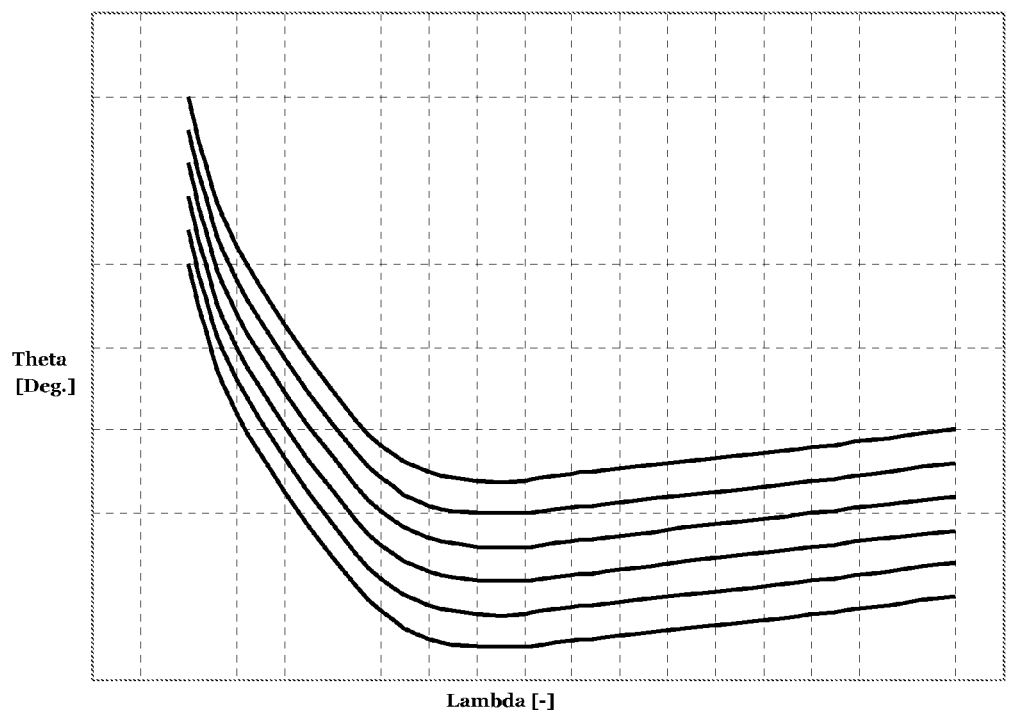
FIG. 2 is a graph illustrating a set of pitch versus tip speed ratio curves which may be used when performing the method illustrated in FIG. 1.

FIG. 2 is a graph illustrating a group of $\theta$ versus $\lambda$ curves which may be used when performing the method illustrated in the flow diagram of FIG. 1 during steps 2 and 6. Thus, each of the curves of the graph of FIG. 2 represents a pitch and rotational speed curve which can be applied to a wind turbine in order to control operation of the wind turbine in such a manner that simultaneous values of $\theta$ and $\lambda$ follow a selected curve. All of the curves shown in FIG. 2 in combination represent a group of pitch and rotational speed curves When performing the method illustrated in the flow diagram of FIG. 1, each of the curves shown in FIG. 2 is sequentially selected, and the wind turbine is operated in accordance with the selected curve for a certain time period, while monitoring one or more target parameters. This is repeated a predetermined number of times, and an optimum curve is determined based on the data obtained by monitoring the target parameter(s).

Figure 3:
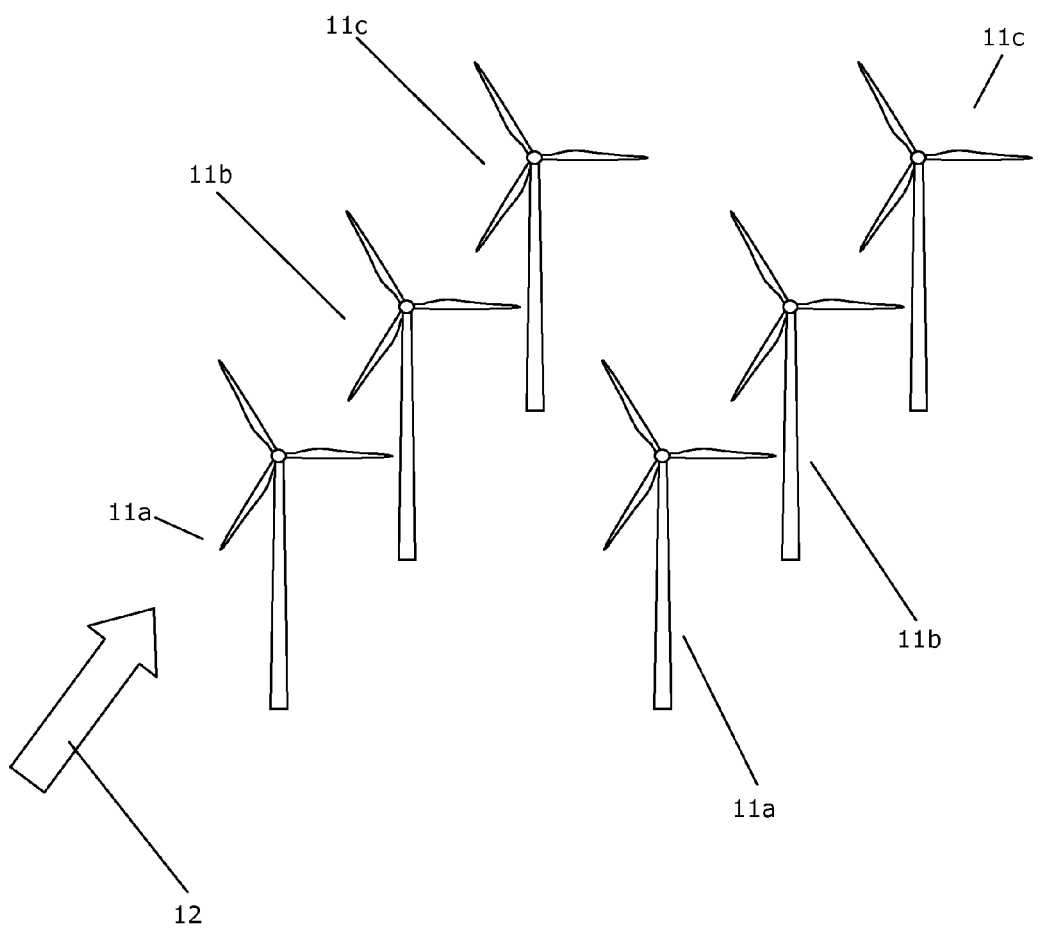
FIG. 3 illustrates a plurality of wind turbines arranged in a wind farm.

FIG. 3 shows six wind turbines 11 arranged in a wind farm. Arrow 12 indicates the wind direction.

As described above, the method of the invention is particularly suitable for controlling operation of wind turbines 11 which are arranged in a wind farm. In the wind farm illustrated in FIG. 3 the wind turbines 11a are arranged in front of the other wind turbines 11b, 11c along the wind direction 12. Thus, the wind received at wind turbines 11a contains a maximum possible amount of energy under the given conditions. The wind turbines 11b are positioned behind the wind turbines 11a, i.e. they are at least partly in the wake of the wind turbines 11a. Accordingly, the wind received at wind turbines 11b contains a smaller amount of energy than the wind received at wind turbines 11a. Finally, the wind turbines 11c are arranged behind the wind turbines 11a as well as behind the wind turbines 11b, i.e. at least partly in the wake of these wind turbines 11a, 11b. Accordingly, the wind received at wind turbines 11c contains an even smaller amount of energy than the wind received at wind turbines 11b.

If operation of the wind turbines 11 is controlled in a manner which takes the circumstances described above into account, the wind farm can be controlled in a manner which is optimal, e.g. in terms of overall power production and/or overall load or wear on the wind turbines 11, without necessarily controlling operation of the individual wind turbine 11 in an optimal manner. Thereby it may, e.g., be possible to utilise the energy present in the wind to the maximum possible extent, while minimising the load or wear on the components of the wind turbines. In order to obtain this, the individual wind turbine 11 must be operated in a manner which takes data obtained from neighbouring wind turbines into account.

For instance, the wind turbines 11a may be operated in a manner which extracts an amount of energy from the wind which is less than the maximum possible extractable amount. Thereby the loads and wear on the components of the wind turbines 11a are reduced. Simultaneously, a larger amount of energy remains in the wind and is passed on to the wind turbines 11b, 11c arranged behind the wind turbines 11a. Thereby the energy extracting potential of the wind turbines 11b, 11c arranged in the wake of the wind turbines 11a can be utilised to a greater extent. As a consequence, the total energy extracting potential of all of the wind turbines 11 of the wind farm is utilised to a greater extent, while reducing the loads and wear on the components of the individual wind turbine 11.

The invention claimed is:

1. A method for controlling operation of a wind turbine, the method comprising:
    (a) selecting a pitch and rotational speed curve from a group of pitch and rotational speed curves,
    (b) operating the wind turbine in accordance with said selected curve, while monitoring at least one target parameter,
    (c) repeating the steps of selecting a pitch and rotational speed curve and operating the wind turbine until each of the curves of the group of pitch and rotational speed curves has been selected,
    (d) repeating steps a)-c) a predetermined number of times,
    (e) based on the monitored target parameter(s), determining an optimum curve among the curves of the group of pitch and rotational speed curves, and
    (f) controlling operation of the wind turbine in accordance with the optimum curve.

2. A method according to claim 1, wherein the pitch and rotational speed curves are optimal tip speed ratio curves and/or optimal pitch curves.

3. A method according to claim 1, wherein the monitored target parameter(s) include power production of the wind turbine.

4. A method according to claim 1, wherein the monitored target parameter(s) include load on one or more components of the wind turbine.

5. A method according to claim 1, further comprising the step of repeating steps a)-f) after a predefined time interval has lapsed.

6. A method according to claim 5, wherein the predefined time interval is substantially longer than the time required for performing steps a)-e).

7. A method according to claim 1, wherein the step of determining an optimum curve among the curves of the group of pitch and rotational speed curves is further performed on the basis of statistical data relating to operation of the wind turbine, said statistical data having been previously obtained and stored.

8. A method according to claim 1, wherein the operation of each of the wind turbines is further controlled on the basis of data obtained for one or more of the remaining wind turbines of the wind farm.

9. A method for controlling operation of a wind turbine, the method comprising:
    (a) selecting a pitch and rotational speed curve from a group of pitch and rotational speed curves,
    (b) operating the wind turbine in accordance with said selected curve, while monitoring at least one target parameter,
    (c) repeating selecting a pitch and rotational speed curve and operating the wind turbine until each of the curves of the group of pitch and rotational speed curves has been selected,
    (d) repeating steps a)-c) a predetermined number of times,
    (e) based on the monitored target parameter(s) and information relating to one or more neighboring wind turbines, determining an optimum curve among the curves of the group of pitch and rotational speed curves, and
    (f) controlling operation of the wind turbine in accordance with the optimum curve.

10. A method according to claim 9, wherein the information relating to one or more neighboring wind turbines has been obtained by performing at least the steps a)-e) with respect to each of the neighboring wind turbines.

11. A method according to claim 9, wherein the pitch and rotational speed curves are optimal tip speed ratio curves and/or optimal pitch curves.

12. A method according to claim 9, wherein the monitored target parameter(s) include power production of the wind turbine.

13. A method according to claim 9, wherein the monitored target parameter(s) include load on one or more components of the wind turbine.

14. A method according to claim 9, further comprising repeating steps a)-f) after a predefined time interval has lapsed.

15. A method for controlling operation of a plurality of wind turbines positioned in a wind farm, the method comprising, for each of the wind turbines:
    (a) selecting a pitch and rotational speed curve from a group of pitch and rotational speed curves,
    (b) operating the wind turbine in accordance with said selected curve, while monitoring at least one target parameter, (c) repeating selecting a pitch and rotational speed curve and operating the wind turbine until each of the curves of the group of pitch and rotational speed curves has been selected, (d) based on the monitored target parameter(s), determining an optimum curve among the curves of the group of pitch and rotational speed curves, and (e) controlling operation of the wind turbine in accordance with the optimum curve.

16. A method according to claim 15, wherein the step of determining an optimum curve among the curves of the group of pitch and rotational speed curves is further performed on the basis of information relating to one or more neighboring wind turbines.

17. A method according to claim 16, wherein the information relating to one or more neighboring wind turbines has been obtained by performing at least the steps a)-d) with respect to each of the neighboring wind turbines.

18. A method according to claim 17, further comprising repeating steps a)-c) a predetermined number of times.

19. A method according to claim 17, wherein the pitch and rotational speed curves comprise optimal tip speed ratio curves and optimal pitch curves.

20. A method according to claim 17, wherein the monitored target parameter(s) include power production of the wind turbine.

* * * * *